Patented Oct. 28, 1952

2,615,848

UNITED STATES PATENT OFFICE 2,615,848

METHOD OF PRODUCING MAGNESIUM ARSENATE PHOSPHOR ACTIVATED BY MANGANESE

Robert Stirling Wells, Rugby, England, assignor to General Electric Company, a corporation of New York No Drawing. Application October 16, 1951, Serial No. 251,629. In Great Britain November 8, 1950

2 Claims. (Cl. 252—301.4)

1

This invention relates to luminescent materials giving a luminescence in the red region of the spectrum when excited by short-wave ultraviolet radiation, for instance from the low pressure mercury arc, and by long-wave ultraviolet radiation, such as is produced by the high pressure mercury vapor arc.

The luminescent material with which this invention is concerned is a compound or fired reaction product of magnesium oxide and arsenic oxide, activated with manganese and which may contain some fluorine. Such a material has been found to give good results when the gram-molecule ratio between magnesium oxide (MgO) and arsenic pentoxide ($As_2O_5$) exceeds 3:1 and is preferably between 8:1 and 10:1. The manganese content may vary widely, for instance between 0.001 and 5 mol percent with respect to the magnesium oxide, and preferably between 0.05 and 0.6 mol percent.

The prior method of preparation of a luminescent material having these constituents has involved heating together for a period of about 15 hours, at a temperature above 500° C. and preferably about 1150° C., an intimate mixture of magnesium oxide (MgO), arsenic oxide ($As_2O_5$), manganese carbonate ($MnCO_3$) and hydrofluoric acid (HF). The following preferred proportions were employed, viz., 9 to 10 gm. mols MgO, 1 gm. mol $As_2O_5$, .006 to .007 gm. mol $MnCO_3$ and 2 milliliters of 40% solution of HF; the preparation was effected by mixing the dry ingredients into a paste with distilled water to which the solution of HF was added and subsequently drying the mixture prior to the prolonged heating necessary to effect the chemical and physical change required to develop the luminescence.

It is necessary that the material should be kept in the oxidized state to develop full luminescence, and I have found that beneficial results are obtained when firing in air is prolonged even to 100 hours at 1150° C. when using the above method. Such long firing at high temperature is necessarily an inconvenience in large-scale production.

The object of the invention is to enable the prolonged heating period to be reduced, and to this end, according to the invention, I employ magnesium peroxide, or a mixture of magnesium peroxide and magnesium oxide, as the starting material from which the magnesium content of the luminescent material is derived.

In carrying out the invention, I may replace the MgO used in the preparation of the luminescent material as mentioned above with an equivalent amount of commercially available chemically pure quality $MgO_2$ which contains approximately 25% $MgO_2$ and 75% MgO, by weight. With this replacement, the heating period is reduced to from 2 to 5 hours using the

2 constituents specified above. The longer heating time is required when larger quantities of the mixtures are being prepared.

If a lower content of $MgO_2$ is used, e. g., 15%, the benefit conferred is proportionally less.

When using $MgO_2$ in partial or complete replacement for MgO, it is possible to dispense with the HF mentioned in the first method, and I then prefer to use an equivalent amount of $Mn(NO_3)_2$ as a 10% solution in water instead of $MnCO_3$.

The following is an example of a method of preparing a luminescent material in accordance with the invention:

| | |
|---|---|
| Magnesium peroxide (containing 25% $MgO_2$) ----------gms-- | 144.0 |
| $As_2O_5$ ----------gms-- | 76.0 |
| $Mn(NO_3)_2.6H_2O$ as 10% solution in water ----------mls-- | 1.8 |

Dissolve the $As_2O_5$ in water and add with the $Mn(NO_3)_2$ to the magnesium peroxide to make a paste (about 360 mls. of water in all are required). Dry at 105° to 140° C. Fire at 1150° C. for 2 hours at a time until maximum brilliance is attained; two firings should be sufficient.

What I claim as new and desire to secure by Letters Patent of the United States is:

1. In the method of preparing a luminescent material by heating at a temperature of about 1150° C. compounds of magnesium, arsenic and manganese in proportions to furnish magnesium oxide and arsenic pentoxide in a mol ratio between about 8:1 and 10:1 and manganese in an amount of about 0.001 to 5 mol percent of the magnesium oxide, the improvement which comprises employing as the magnesium compound a material of the group consisting of magnesium peroxide and mixtures of magnesium peroxide and magnesium oxide containing at least about 25% magnesium peroxide, and firing the mixture for about two to five hours.

2. The method of preparing a luminescent material which comprises mixing together in proportions corresponding to about 76 grams $As_2O_5$ dissolved in water, about 1.8 milliliters $Mn(NO_3)_2.6H_2O$ as a 10% solution in water, and about 144 grams of magnesium peroxide containing about 25% $MgO_2$ and 75% MgO, to make a paste, drying the paste, and firing at about 1150° C. for about two to four hours.

ROBERT STIRLING WELLS.

REFERENCES CITED

The following references are of record in the file of this patent:

FOREIGN PATENTS

| Number | Country | Date |
|---|---|---|
| 628,308 | Great Britain | Aug. 25, 1949 |